United States Patent [19]

Skaletz et al.

[11] Patent Number: 5,571,356
[45] Date of Patent: Nov. 5, 1996

[54] THERMOFORMABLE, FIBER-REINFORCED COMPOSITE MATERIAL, PROCESS FOR ITS PRODUCTION AND USE

[75] Inventors: Detlef Skaletz, Mainz; Ludger Czyborra, Aachen; Horst Heckel, Darmstadt; Karin Mehmke, Frankfurt am Main, all of Germany

[73] Assignee: Hoechst Aktiengesellschaft, Germany

[21] Appl. No.: 189,044

[22] Filed: Jan. 31, 1994

[30] Foreign Application Priority Data

Feb. 2, 1993 [DE] Germany .......................... 43 02 782.2

[51] Int. Cl.⁶ .......................................................... B32B 5/08
[52] U.S. Cl. ............................ 156/166; 156/161; 156/242
[58] Field of Search ..................................... 156/161, 242, 156/166

[56] References Cited

U.S. PATENT DOCUMENTS 4,559,262  12/1985  Cogswell et al. ....................... 156/166
5,002,712   3/1991  Goldmann et al. .

FOREIGN PATENT DOCUMENTS

| 0056703 | 7/1982 | European Pat. Off. . |
|---|---|---|
| 0360430 | 3/1990 | European Pat. Off. . |
| 0364829 | 4/1990 | European Pat. Off. . |
| 0056703 | 5/1992 | European Pat. Off. . |
| WO92/21493 | 12/1992 | European Pat. Off. . |
| 0426716 | 5/1993 | European Pat. Off. . |

*Primary Examiner*—James J. Bell
*Attorney, Agent, or Firm*—Curtis, Morris & Safford, P.C.

[57] ABSTRACT

A thermoformable, fiber-reinforced composite material contains 5 to 70% by volume of unidirectionally aligned reinforcing fibers having individual filament diameters of 7 to 30 μm, which are bonded by a matrix of a thermoplastic elastomer-modified polypropylene which essentially wets the entire surface of the individual filaments.

The elastomer-modified polypropylene preferably consists of a mixture of polypropylene with thermoplastic ethylene-propylene-diene rubber (EPDM) and/or ethylenepropylene rubber (EPM). The reinforcing fibers preferably consist of glass.

4 Claims, No Drawings

THERMOFORMABLE, FIBER-REINFORCED COMPOSITE MATERIAL, PROCESS FOR ITS PRODUCTION AND USE

The present invention relates to a thermoformable composite material having a matrix of elastomer-modified polypropylene and a content of reinforcing fibers.

According to the process of EP Patent 56703 (ICI), a fiber-reinforced, heat-deformable composite material which contains thermoplastic polymer and at least 30% by volume of reinforcing fibers aligned in parallel is obtained by a pultrusion process. The process should make it possible to employ conventional thermoplastic materials for the impregnation of fiber strands. However, the process is no longer suitable for polymers which have a high viscosity (above 100 $Ns/m^2$) at the processing temperature, since wetting of fiber strands with such melts in the pultrusion process is no longer possible without special precautions.

Composite materials are commercially available whose matrix consists of polypropylene and whose reinforcing fibers consist e.g. of glass fibers. These materials are available in pellet form, but also in the form of continuous filaments. The materials can be prepared economically and have good recycling behavior. Unfortunately, these materials have poor adhesion to paints.

A good adhesion of the coating is indispensable, for example, in the use of fiber-reinforced composite materials in the automobile area and here, especially, in the highly loaded components for the external area. As the coating should be as inexpensive as possible, complicated pre- and intermediate treatment steps are disadvantageous.

There is therefore additionally a need for a thermoformable, reinforced composite material which, on as complete a wetting of the fibers as possible by the matrix polymer, has adequately good mechanical properties and good recycling behavior and additionally guarantees an adhesion for paints which is as good as possible.

The present invention is thus based on the object of making available a fiber-reinforced composite material which in particular guarantees a good coatability.

The subject of the invention is a thermoformable, fiber-reinforced composite material having a content of 5 to 70% by volume of unidirectionally aligned reinforcing fibers having individual filament diameters of 7 to 30 μm, which are bonded by a matrix of a thermoplastic polymer which essentially wets the entire surface of the individual filaments. This composite material is characterized in that the thermoplastic polymer is an elastomer-modified polypropylene.

The elastomer-modified polypropylene preferably consists of a mixture or a blend of polypropylene with thermoplastic ethylene-propylene-diene rubber (EPDM) and/or ethylene-propylene rubber (EPM).

More advantageously, the proportion of EPDM and/or EPM is 2 to 40% by weight, preferably 5 to 30% by weight based the weight of the elastomer-modified polypropylene. The individual filament diameters of the reinforcing fibers are preferably in the range from 7 to 24 μm. The proportion by volume of the reinforcing fibers is preferably 15 to 50% by volume.

The reinforcing fibers are in general those composed of glass, carbon, aramid, metal, ceramic and/or other adequately temperature-resistant fibers composed of polymer material.

Customary fillers, flame retardants, lubricants and color pigments and/or other auxiliaries customarily used in the processing of elastomer-modified polypropylene can be added to the thermoformable, fiber-reinforced composite material according to the invention.

A substantial advantage of the fiber composite material according to the invention is its very high adhesion to paints, such as are used, for example, in the automobile external area. An additional pretreatment of the component surface to be coated, such as, for example, flame, plasma or corona treatment, can therefore be dispensed with.

The nonpolar surface of the polypropylene blends makes a coating process complicated. Besides thorough cleaning of the parts, good paint adhesion usually necessitates an additional pretreatment by means of flame, plasma or corona treatment (Ch. Gruner et al., Kunststoffe 82 (1992) 802). High proportions of EPDM do improve the adhesive power of certain paint binders but at the same time reduce the mechanical stability. If talc is employed as filler, the paint adhesion is improved (Kunststoffe 82,803) but on the other hand not if short glass fibers (less than 0.5 mm) are employed as filler.

In the composite material according to the invention, the reinforcing fibers are substantially longer than 0.5 mm and are arranged essentially parallel to one another. It is surprising that the composite materials according to the invention can be painted and a pretreatment is not even necessary for this purpose.

On account of the favourable adhesion properties associated with very good mechanical properties, such as high rigidity and toughness, the composite material according to the invention is particularly suitable for the production of those molded parts of reinforced plastic which are intended to be recyclable and paintable in a simple manner, but with good adhesion. There is thus, for example, in body construction, both for visual reasons and for increasing the scratch resistance or chemical and weathering resistance, an increasing need for paintable fiber-reinforced plastic materials.

As the composite materials according to the invention fulfill these requirements in an outstanding manner, a further subject of the present invention is the use of these materials for the production of paintable molded parts, in particular for automobile construction.

In cut form, the composite materials according to the invention are in general machined by injection molding, blow molding, extrusion or pressing or mixtures of these processes to give molded parts, for example to give body components. Polypropylene, PP/EPDM or PP/EPM in fiber-free or short fiber-reinforced form or mixtures of these components can be added in this process. Short fiber reinforcement is understood in this connection as meaning reinforcement by short fibers of at most 0.5 nun in length. These fibers are thus distinctly shorter than the dimensions of the composite material according to the invention, whose pellets and thus whose fibers have lengths of at least 3 mm, preferably at least 9 mm.

In addition, wound molded parts can be produced from the composite material according to the invention, if it is available in the form of continuous ribbons.

There are a number of elastomer-modified polypropylene blends of different composition, which differ, inter alia, due to the molecular weight and thus the melt viscosity. The composite material according to the invention can be produced from a matrix polymer and reinforcing fiber processes which are known per se, in particular by the pultrusion process. Such a pultrusion process is disclosed e.g. for low melt viscosities in EP Patent 56703.

In one process for the production of a thermoformable, fiber-reinforced composite material according to the invention, a plurality of continuous filaments having individual filament diameters of 7 to 30 μm are arranged in parallel in the form of a ribbon and tensioned and the filament ribbon is impregnated with molten elastomermodified polypropylene in a melt pultrusion process, the filament ribbon being drawn over at least two heated spreader surfaces. A proportion by volume of 5 to 70% by volume of continuous filaments is established in this process in the solidifying filament ribbon.

If the melt viscosity of the polypropylene blend used is high, in particular in the range from 105 to 2500 Pa·s (measured at low shear rates), it is advantageous if the drawing tension of the continuous filaments on entry into the first spreader surface is adjusted to 5 to 50N per 4000 individual filaments. In this manner, despite the high viscosity, good wetting and impregnation can be obtained. A substantial economic advantage of this process embodiment is that the speed of the thread ribbon can increase to at least 3 m per minute without the wetting and impregnation of the individual filaments being impaired. It is also advantageous if the drawing tension during the drawing off of the impregnated filament ribbon from the last spreader surface is at least 50N per 4000 individual filaments.

The pultrusion material thus prepared can be comminuted into pieces (pellets) 3 to 100 mm long, in particular 10 to 50 mm long. The length of the reinforcing fibers corresponds to the length of the pellets thus produced.

A process for the production of composite materials by a pultrusion process using a polymer having a melt viscosity of 105 to 2500 Pa·s is the subject of the previously unpublished German Patent Application P 42 23241.4, to which reference is expressly made hereby.

For economic reasons, an impregnation rate of 3 to 40 m/min, preferably of 10 to 30 m/min, is preferred. The viscosity of the melt is preferably in the range from 130 to 2000 Pa·s, in particular 130 to 500 Pa·s.

The drawing tension during the drawing off of the impregnated filament ribbon from the last spreader surface is, inter alia, higher than the drawing tension during the running into the first spreader surface and is preferably at least 50N per 4000 individual filaments.

It is favourable if the geometry of the spreader surfaces is such that the nips defined by spreader surfaces and entering ribbon are filled with melt and the bundle of continuous filaments is not brought into direct contact with the delivery opening for the melt. The supply of the molten polymer can take place in any desired position of the impregnation device if the fibers do not touch this position. The spreader surfaces are preferably of undulatory form. As a result of the tractive and superimposed pressure flow produced in the impregnation device, a pressure of at least 1.5 bar, which always provides for complete filling of the impregnation device, is in general applied between the last spreader surface and the outlet opening of the impregnation device.

The proportion by volume of fibers in the semi-finished product can be affected by adjusting the delivery rate of the polymer melt in relation to the filament velocity. In addition, superfluous amounts of polymer melt can be stripped off through perforated plates.

The parallel unidirectionally orientated reinforcing filaments needed in the process according to the invention, which consist of many filaments, are unwound from fiber bobbins (rovings) with control of the take-off force. This control can be effected mechanically, mechano-physically, electrically or electronically. Customarily, this directly applied take-off pretension is in the range from 10N to about 25N, depending on the type of rovings used and the strength of the fibers.

It has emerged that the take-off tension, once set, should advantageously be kept as constant as possible.

An apparatus which is suitable, inter alia, to keep the take-off tension constant mechanically is the subject of German Utility Model 9 107 510.0 (Bolenz & Schäfer Maschinenfabrik GmbH).

The pretension can be increased, if necessary, by inserting one or more further pairs of tensioning bars between the bobbin and impregnation device. The time- and also the roving-dependent constancy of the pretension remains guaranteed here.

As a result of the number, the diameter and the position of the tensioning bars determining the angle of wrap, the take-off tension needed for the transport of the filaments can be varied within wide limits. The tension increases further and further here, starting from the bobbin in the direction of the braking system, guide element/combs up to the guide bars before the 1st spreader surface. After wetting of the filament, the tension increases further (in the direction of winding bobbin for composite material).

The fibers, which are thus aligned in parallel and pretensioned, now enter the impregnation device, in the melt pultrusion process in particular an impregnation die. To accelerate the throughput, the fibers can be preheated. Temperatures of up to 100K below or above the processing temperature of the melt have proven suitable here. The heating of the filaments can be effected by infrared, contact, radiation, steam, water or hot gas preheating.

Devices having spreader surfaces for the impregnation of fiber material are known. U.S. Pat. No. 4,439,387 discloses an extruder apparatus in which several fiber strands are drawn at different positions, which are arranged in succession in the transport direction of the material, into the interior of the apparatus filled with polymer melt and impregnated there with melt. The spreader surfaces 212, 214 and 216 should in this case improve the wetting of the fiber strands with melt.

An apparatus which is highly suitable for carrying out the process according to the invention is described in U.S. Pat. No. 4,957,422. The chicane (b) in the entry part (1) of the apparatus (before wetting with melt) represented in the FIG. 1 shown there can be dispensed with in the process according to the invention.

The impregnation device used is preferably essentially closed, such that the ingress of atmospheric oxygen and the thermooxidative polymer damage associated therewith can be kept small. Inside the impregnation device, the fibers are preferably drawn over at least three spreader surfaces. These are of undulatory shape.

Using a broad impregnation die, a multiplicity of individual filament ribbons can be obtained. When using a slit die, the whole of the wetted filament ribbons can be combined to give a single ribbon and this can then be fed to a polishing roll mill. The slit die can have e.g. slit heights from 0.15 to 5, in particular 0.4 to 2 mm. The component strands can be shaped by controlled roll systems and be given e.g. a rectangular, elliptical or circular cross section.

Semi-finished products can be produced in the form of continuous, broad ribbons (tapes) of up to 500 mm, preferably 100 to 320mm, and thicknesses between 0.2 and 0.7 mm, and also profiles in a wide range of dimensions (flat 25×0.25 mm, 5×0.4 mm, 2.5×0.8 mm etc., round profiles up to diameters of about 5 mm) and as single or multiple strands, or strands having diameters up to 5 mm, which can then be cut to give longitudinal sections (pellets) of 3 to 100 mm, preferably 10 to 50 mm. These strands can also be prepared in parallel and simultaneously as a single semi-finished product or in a number of 150 strands.

The invention is illustrated in greater detail by the examples.

EXAMPLES

Example 1

A filament ribbon of E-glass fibers (commercially available, compatible size) was pultruded (speed of the filament ribbon 11 m/min) with molten PP/EPDM (extruder blend PPT 8027 from Hoechst AG) at 255° C. using a high tension (22N/4000 individual filaments, measured on entry into the first spreader surface). The melt had a viscosity of about 700 Pa·s. The EPDM content of the PP/EPDM employed was about 15% by weight. A glass content of 51.2% by weight was shown by ashing of the product obtained. The impregnated fiber strand obtained was cut into pieces (pellets) 10 mm long.

Example 2 (Comparison Example)

Example 1 was repeated, but with polypropylene as matrix polymer. The melt had a viscosity of 370 Pa·s. A glass content of 49.2% by weight was determined by ashing of the product. The impregnated fiber strand obtained was cut into pellets 10 mm long.

By injection molding, test articles on which the mechanical characteristics were determined were in each case obtained from the pellets. These are presented in the following Table 1. For injection molding, an injection molding machine from NETSTAL [free-flow die and nonreturn stop, closing force of 130 t, 3-zone screw conveyer (9D, 6D, 6D) having a screw diameter of 40 mm and a compression ratio of 1.83] was employed. The injection molding conditions were as follows: cylinder temperature: 210 to 240° C., substance temperature: 245° to 250° C., apparatus temperature: 70° C., screw rotational speed: 50 to 70 rpm, specific injection pressure: 1700 bar, specific back presssure: 110 bar, injection rate: 45 to 60 mm/s, additional pressure period: 15 to 20 s, cooling period: 30 s.

TABLE 1

| Property | Unit | Test Method | Values for Example 1 | Values for Example 2 |
| --- | --- | --- | --- | --- |
| Tensile strength | N/mm$^2$ | DIN 53455 | 84 | 115 |
| Tensile modulus of elasticity | N/mm$^2$ | DIN 53457 | 8490 | 10500 |
| Elongation at break | % | DIN 53455 | 2.4 | 1.7 |
| Flexural strength | N/mm$^2$ | DIN 53452 | 157 | 205 |
| Flexural modulus of elasticity | N/mm$^2$ | DIN 53457 | 9600 | 11100 |
| Izod notched bar impact strength | kJ/m$^2$ | ISO 180/1A | 20 | 21 |
| Charpy impact strength | kJ/m$^2$ | ISO 179/1eU | 50 | 52 |

Example 3

Plates were prepared from the pellets according to Example 1 and from the pellets according to Example 2 by injection molding and painted. After flaming as a pretreatment, a two-component solvent primer No. 63270 and then a 2-component solvent solid top coat paint No. U 1240, in each case from Wörwag (Stuttgart), were in each case applied for this purpose.

In the case of the plates of the comparison example, a multiplicity of spots were seen on the surface, which were probably formed by standing up of the fibers or by wetting defects, while the surface of the plates of the corresponding example were smooth.

For paint adheshion (cross-cut test according to DIN 53 151:

Assessment scale from GT 0 to GT 5 for decreasing adhesion) a value of GT 0 resulted for Example 1 and one of GT 5 for the comparison example.

Table 1 shows that the better paintability is not attained at the expense of poor mechanical properties, but together with good toughnesses and better elongation at break, the strength and in particular the rigidity (modulus of elasticity) remain in acceptable ranges.

Example 4

Example 1 was repeated, but the extruder blend PPT 8018 B from Hoechst AG, whose EPDM content was approximately 27% by weight, was employed as elastomer-modified PP/EPDM. The glass content was not analyzed.

Example 5

Example 1 was repeated, but the reactor blend PPT 9027 from Hoechst AG was employed as elastomer-modified PP/EPDM. The glass content was not analyzed.

As described above, test articles were produced from the pellets obtained. The characteristic data determined on these are shown in Table 2.

TABLE 2

| Property | Unit | Test Method | Values for Example 4 | Values for Example 5 |
| --- | --- | --- | --- | --- |
| Tensile strength | N/mm$^2$ | DIN 53455 | 81 | 84 |
| Tensile modulus of elasticity | N/mm$^2$ | DIN 53457 | 8370 | 9190 |
| Elongation at break | % | DIN 53455 | 2.3 | 2.3 |
| Flexural strength | N/mm$^2$ | DIN 53452 | 150 | 154 |
| Flexural modulus of elasticity | N/mm$^2$ | DIN 53457 | 9070 | 9770 |
| Izod notched bar impact strength | kJ/m$^2$ | ISO 180/1A | — | — |
| Charpy impact strength | kJ/m$^2$ | ISO 179/1eU | 68 | 67 |

We claim:

1. A process for the production of a thermoformable, fiber-reinforced composite material, in which a multiplicity of continuous filaments having individual filament diameters of 7 to 30 μm are arranged in parallel to form a ribbon and tensioned, the filament ribbon is impregnated with molten thermoplastic polymer in a melt pultrusion process, the filament ribbon being drawn over at least two heated spreader surfaces and a proportion by volume of 5 to 70% by volume of continuous filaments being established in the solidifying filament ribbon, which comprises using an elastomer-modified polypropylene as the thermoplastic polymer which., m.easured at low shear rates, has a viscosi.t.y of 105 to 2500 Pa·s and the drawing tension is set to 5 to 50N per 4000 individual filaments on entry into the first spreader surface.

2. The process as claimed in claim 1, wherein the speed of the filament ribbon is at least 3 m/min.

3. The process as claimed in claim 1, wherein the drawing tension during the drawing off of the impregnated filament ribbon from the last spreader surface is at least 50N per 4000 individual filaments.

4. The process as claimed in claim 1, wherein the geometry of the spreader surfaces is adjusted such that the nips defined by spreader surfaces and entering ribbon are filled with melt.

* * * * *